July 11, 1961 J. C. SPINDLER 2,992,412

REMOTE CONTROL SYSTEM

Filed April 23, 1959 2 Sheets-Sheet 1

INVENTOR
Joseph C. Spindler

BY James E. Jennings, Jr.
ATTORNEY

July 11, 1961 J. C. SPINDLER 2,992,412

REMOTE CONTROL SYSTEM

Filed April 23, 1959 2 Sheets-Sheet 2

INVENTOR
Joseph C. Spindler
BY James L. Jennings, Jr.
ATTORNEY

United States Patent Office 2,992,412

Patented July 11, 1961

2,992,412

REMOTE CONTROL SYSTEM

Joseph C. Spindler, Chicago, Ill., assignor to Zenith Radio Corporation, a corporation of Delaware Filed Apr. 23, 1959, Ser. No. 808,530
8 Claims. (Cl. 340—171)

Figure 1:
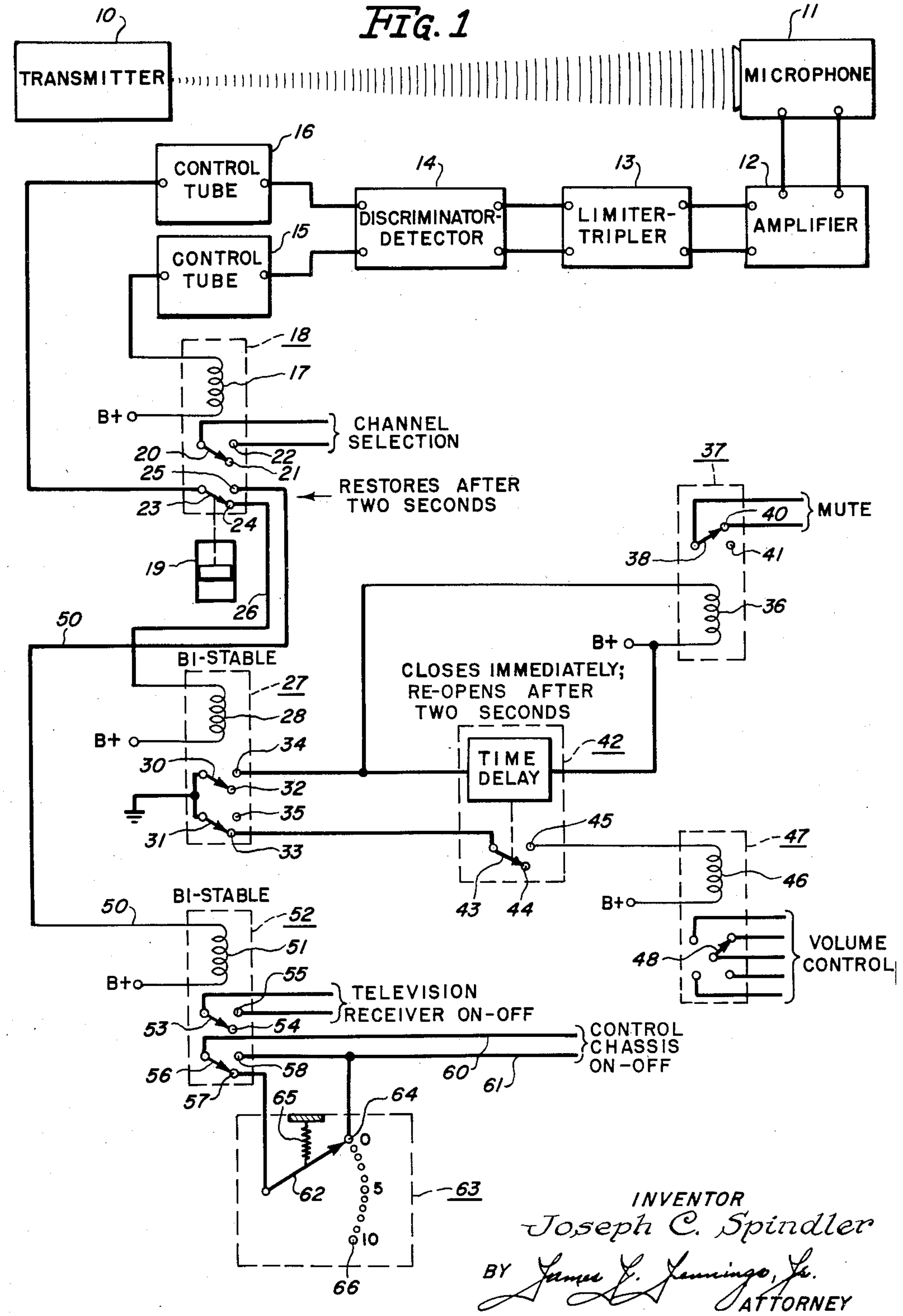

This invention relates to remote control systems for selectively accomplishing any of a plurality of functions at a controlled or satellite station in response to command signals originated at a remotely located controlling station. More particularly, the invention is directed to enhancing the versatility and capabilities of such a system by providing a plurality of controlled functions which are effected by discrimination based on the specific frequency of the received command signal, and/or the time interval between two received signals of like or unlike frequency.

Remote control systems of the type under consideration are useful in a variety of installations both in the home and in industry. Familiar examples of domestic installations include the control of radio and television receivers, garage doors, slide projectors, etc. Industrial uses are numerous, including the control of work-handling devices in general, furnaces, metalworking apparatus and the like. For the purpose of providing a specific disclosure of the invention, it is convenient to consider its application to a television receiver for use in the home.

A remote control system for radiating a particular command signal and adjusting one of several operating characteristics of a television receiver installed in the home in accordance with the particular signal received is the subject of United States Letters Patent 2,817,025, issued December 17, 1957, to Robert Adler, and assigned to the assignee of the present invention. As there described, four different command signals are generated at the transmitter and propagated to the receiver. Each signal is of a different frequency; the four signal frequencies are grouped within a narrow portion of the frequency spectrum. The control chassis has a correspondingly narrow acceptance bandwidth and therefore is relatively free from the influence of interfering signals of other frequencies which may be present at the receiver location. By assigning a different frequency to each of the command signals and by employing frequency-selective channels in the receiver, it is possible to determine at the receiver location exactly which of the several functions is to be controlled. In the Adler patent, four different command signals may be selectively transmitted and in turn four different functions are controlled at the television receiver. The controlled functions may be, for example, regulation of an on-off switch in the television receiver, the rotation of the channel selector in either direction (rotation in two directions is two separate functions), and regulation of the volume level or muting. However, an appreciable reduction in cost and complexity of the remote control receiver circuitry can be effected by providing only two controlled functions. Accordingly, a ready market has also been found for a two-button or a two-signal control system regulating channel selection by unidirectional rotation of the tuner elements and also providing adjustment of the receiver volume level. Of course, it would be desirable to add other control functions to the receiver used in two-channel operation by incorporating circuit changes only in a portion of the control chassis.

It is therefore a principal object of the invention to provide a remote control system of increased versatility and capacity for effecting controlled functions.

It is a more specific object of the invention to provide a new and improved remote control system in which the number of controlled functions which may be accomplished exceeds the number of controlled signal frequencies generated at the command transmitting device.

It is a particular object of the invention to provide a remote control system of enhanced versatility by distinguishing between the command signals on the basis of frequency and at least one other parameter.

A remote control system constructed in accordance with one aspect of the invention is useful for selectively accomplishing a number of controlled functions in response to the receipt of a lesser number of control signals. Such a system includes a receiver for the control signals which has a pair of output channels; a first control device is coupled to one output channel, for effecting a first control function in response to receipt of a first control signal. Second and third control devices effect second and third control functions, respectively, in response to receipt of a second control signal. Means are also included which normally establish a first signal path between the other output channel and the second control device, and which also opens this path and establishes a second signal path between this other channel and the third control device for a predetermined time after the first control signal is received, thereby determining which of the second and third control devices is actuated by the second control signal.

Another embodiment of the inventive remote control system includes a receiver, and a first actuating member for effecting a first control function; a first energizing circuit is provided for actuating the first member. A second actuating member is also provided to effect a second control function, as well as a second energizing circuit for actuating this second member. A control device has at least two stable operating conditions and is actuable between these conditions in response to succeeding energizing signals. A first switch is included in the control device and connected in the first energizing circuit, being displaceable between open and closed positions as the control device is itself displaced between its operating conditions. A second switch is also included in the control device, being connected in the second energizing circuit and displaceable between closed and opened positions as the first switch is displaced between opened and closed positions, respectively. An arming switch connected in the second energizing circuit is displaceable from a disarmed position to an armed position as the first switch is displaced from the open to the closed position. Means for restoring the arming switch to the disarmed position at a predetermined time after displacement to the armed position is provided as well as means for coupling the control device to the receiver to utilize the control signals for actuating the control device.

Figure 2:
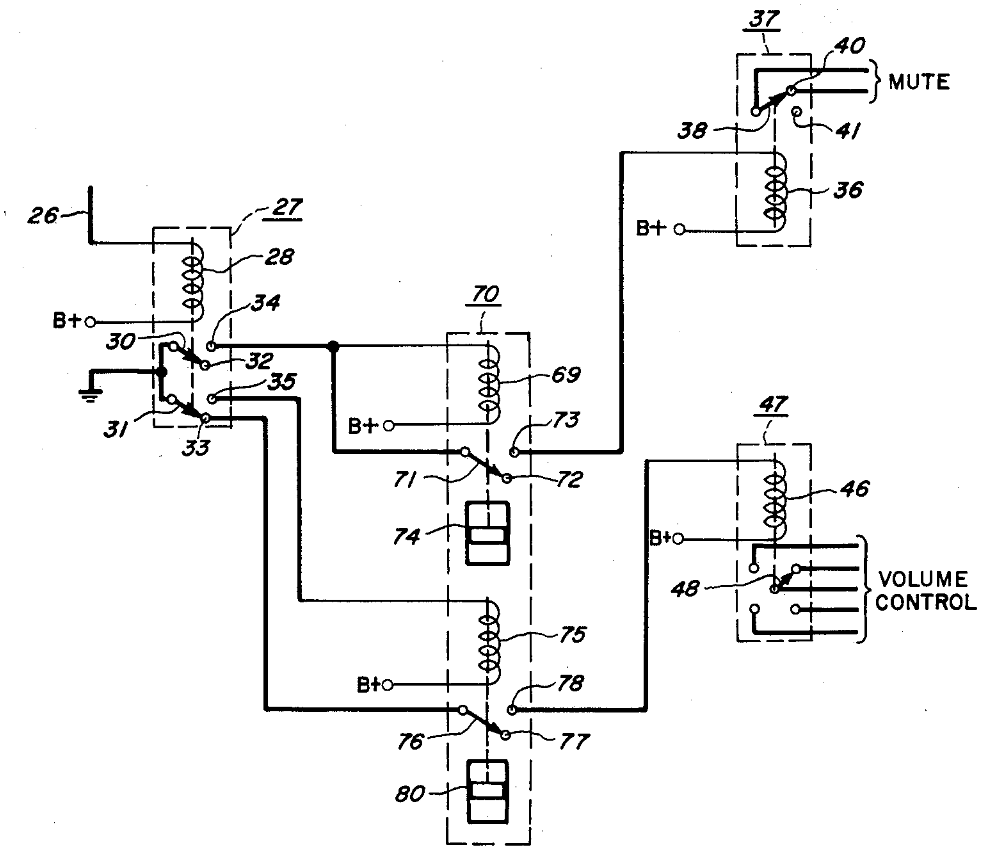

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIGURE 1 is a block diagram of a remote control system constructed in accordance with the invention; and FIGURE 2 is a partial block diagram illustrating another embodiment of the invention.

In the embodiment of the invention indicated in FIGURE 1, the transmitter 10 is indicated in block form. Structural details of the transmitter itself are set forth in system Patent No. 2,817,025; certain details are also disclosed and claimed in Patents Nos. 2,821,954, 2,821,955 and 2,821,956, all issued February 4, 1958, and assigned to the assignee of the present invention. Because the present invention contemplates the use of a transmitter having only two different signals, only two of the cylindrical vibrating rods and striker elements are required instead of the four elements shown in the above-referenced patents. One will be referred to as the channel selector and the other as mute/volume control.

The input element of the receiver is a microphone 11, which is coupled through an amplifier 12 to a limiter-tripler stage 13. The common signal channel including microphone 11, amplifier 12 and limiter-tripler 13 terminates at the input side of a discriminator-detector 14, which has separate output signal channels coupled respectively from each of its two output terminals. The first output signal channel includes a control tube 15 while the second output signal channel includes another control tube 16. As thus far described, the receiver circuitry is identical to that disclosed and claimed in Adler Patent No. 2,817,025, with the single exception that the additional detector and discriminator circuitry normally required for the third and fourth channels has been eliminated.

Regarding the operation of the system as thus far described, transmitter 10 is actuated in a conventional fashion to transmit a command signal of either one of two frequencies. The signal thus radiated is picked up by microphone 11, amplified in amplifier 12, and limited in amplitude and increased in frequency in limiter-tripler stage 13. With the relatively small frequency separation of the command signals utilized, it is desirable to multiply the frequencies of the signals received in microphone 11 so that their absolute frequency separation is greater than that of the two radiated signals. This facilitates their selection and separation in a frequency discriminator.

The frequency-discriminator circuit included in detector stage 14 is such as to apply an actuating pulse or control signal over the first output channel including control tube 15 when a command signal of one frequency is applied to the detector input, and to apply a control or actuating signal over the second output channel including control tube 16 when the received command signal is of the other frequency. Detector arrangements for accomplishing such discrimination are known in the art and are disclosed in the Adler patent. Suffice it here to say that the discriminator characteristic has peaked responses at two frequencies equally spaced on opposite sides of a center frequency, one peak occurring at the frequency of one command signal and the other peak occurring at the frequency of the other command signal.

With respect to the remainder of the receiver circuitry shown in FIGURE 1, the output terminal of control tube 15 is coupled to one side of a winding 17 of a control device or relay 18; the other side of winding 17 is coupled to a source of unidirectional operating potential, conventionally designated B+. Relay 18 includes two separate sets of contacts. Relay arm or movable contact 20 is shown engaging a fixed contact 21 and is displaceable to engage a fixed contact 22 upon the energization of winding 17. Relay arm 23 is illustrated engaging a fixed contact 24, and is displaceable to engage a fixed contact 25 upon the energization of winding 17. Moreover, a time delay is incorporated in the return movement of relay arm 23 in such a manner that after it has been displaced into engagement with contact 25, this position is maintained for an interval of predetermined time duration before movable contact 23 restores to engage contact 24. This time interval may be provided by any well known means, such as a dash pot arrangement as indicated by reference numeral 19, by a magnetic circuit or other methods well known to those skilled in the art.

The other output channel including control tube 16 is coupled over movable contact or relay arm 23, fixed contact 24 and a conductor 26 to another control device or relay arrangement 27. Winding 28 of relay 27 is connected between conductor 26 and B+. Relay winding 28 actuates a pair of movable contacts or relay arms 30 and 31 between a position engaging fixed contacts 32 and 33 and a position engaging fixed contacts 34 and 35. Control device or relay 27 is bi-stable; that is, an actuating pulse applied to winding 28 displaces movable contacts 30 and 31 from the position shown into engagement with contacts 34 and 35, and this position is maintained until receipt of the next actuating pulse which returns the movable contacts to the positions indicated in FIGURE 1.

Contact 34 is coupled to one side of an actuating winding 36 of another bi-stable control device or relay 37; the other side of winding 36 is coupled to B+. Relay 37 includes a movable contact 38 and fixed contacts 40 and 41.

Contact 34 of relay arrangement 27 is also coupled to the input side of a time delay arrangement 42, the other side of which is coupled to B+. Time delay or arming mechanism 42 is of the type which, immediately upon the application of B+ potential thereacross, displaces an arming switch or relay arm 43 from a disarmed position in which it engages a contact 44 into an armed position engaging a contact 45. This armed position is then maintained for a predetermined time duration, after which the relay arm 43 is restored to the disarmed position where it engages contact 44. Such mechanisms are well known and understood in the art and may consist of mechanical dash-pot relays, a relay circuit including a tube with a varying bias arrangement, or other well known systems.

Contact 33 is connected to movable contact 43 and, when this contact is displaced into engagement with contact 45, is also coupled to an actuating winding 46 of another relay 47. Relay 47 is of the stepper type, and when winding 46 is actuated or energized relay arm 48 is displaced one step to engage the next adjacent one of the four separate contacts shown. It is noted that relay arm 48 cannot be stepped until winding 46 is energized, and energization of relay 47 requires the closure not only of contacts 43 and 45, but also the engagement of contacts 31 and 33.

When the output side of control tube 16 is coupled over contacts 23 and 25, the second output signal channel is connected over conductor 50 to an actuating winding 51 of another bi-stable control device 52. Relay 52 includes a first movable contact 53, shown engaging a contact 54 and displaceable to engage a contact 55. Relay 52 also includes a second movable contact 56, illustrated engaging a contact 57 and displaceable to engage a contact 58. The leads connected to switch arm 53 and contact 55 extend from the control chassis to the power supply circuit of the controlled television receiver (not shown), and may by way of example complete the primary winding circuit of the power transformer used in the receiver.

If the control chassis is to turn the associated television receiver on and off in response to a command signal from transmitter 10, the control chassis must be energized. Accordingly, the control chassis is normally energized over a circuit including conductors 60 and 61, conductor 60 being connected to switch arm 56 and conductor 61 being connected to terminal 58. In the position of the mechanism illustrated in the drawing, the control chassis energizing circuit is completed over conductor 60, switch arm 56, contact 57, a switch arm 62 and a contact 64 of a timing device 63, and conductor 61. Timer 63 may be a dash pot arrangement or any other well known structure so arranged that switch arm 62, after being manually displaced from contact 64, restores under the urging of a bias force to this contact after a desired time interval. In the illustrated embodiment the bias force is supplied by a spring 65, which urges switch arm 62 against contact 64. Within timer 63 the reference numerals 0, 5 and 10 indicate increments of time in terms of hours. When switch arm 62 is displaced to engage contact 66 opposite reference numeral 10, the restoring force returns switch arm 62 to again engage contact 64 after a period of ten hours has elapsed. In addition to such well known mechanical arrangements as a dash pot, timer 63 may of course also be an electrical device including a clock in which a timing mechanism is arranged to close a pair of contacts after the elapse of an adjustable interval.

*Receiver on*

In considering the operation of the system shown in FIGURE 1, it is initially assumed that the remote control chassis is energized by manually actuating an on-off switch (not shown) and that the associated television receiver is turned off because armature 53 is resting against contact 54. Accordingly, it is first desired to turn on the receiver. To effect this control function, winding 51 of control device 52 must be energized.

The first or channel selection button of transmitter 10 is actuated by the viewer to radiate a command signal to microphone 11. The frequency of this command signal is integrally related to the peak response frequency of discriminator 14 which applies a command signal to control tube 15. The received command passes through the common signal channel 12—14 and appears as an actuating pulse at the output terminal of control tube 15. This actuating pulse operates relay 18, displacing relay arm 20 into engagement with contact 22 and displacing relay arm 23 into engagement with contact 25 for a period of two seconds. The channel selection circuit including relay arm 20 is ignored for the present; accordingly, it is the connection of relay arm 23 to contact 25 which is significant for the on-off function. Before the two second interval has elapsed, the viewer depresses the second or mute/volume control button of transmitter 10. The frequency of this command signal is integrally related to the other peak response frequency of discriminator 14 and causes an actuating pulse to appear at the output terminal of control tube 16. This pulse is applied over switch arm 23, contact 25 and conductor 50 to winding 51 of bi-stable relay or control device 52. Relay 52 operates and displaces switch arm 53 into engagement with contact 55, thereby completing an obvious energizing circuit for the television receiver. Thereafter, armature 23 returns to engagement with contact 24 but the energizing circuit of the receiver remains closed.

*Channel selection*

It is evident that a channel selection operation has been accomplished together with the turning on of the television receiver, because the described operation of relay 18 was also effective to close contacts 20 and 22. Accordingly, the television receiver input circuits may not be tuned to the channel desired by the viewer. To effect selection of the desired channel, the viewer has only to depress the first or channel selection button the required number of times to provide corresponding energizing signals in the output circuit of control tube 15, which in turn operate relay 18 to close channel selection contacts 20 and 22. Each closure of these contacts energizes a tuning motor to advance a tuning mechanism, such as a turret tuner, from a position which accepts one television channel to a position for accepting another channel, in known manner. Thus the television receiver has been turned on and tuned to the desired channel.

*Mute*

It is now assumed that the viewer wishes to mute the sound from the television receiver. Toward this end, the second or mute button of the transmitter is depressed to provide an actuating signal in the output circuit of control tube 16. This signal is coupled over switch arm 23, contact 24 and conductor 26 to winding 28 of relay 27. Relay 27 operates and movable contacts 30 and 31 are displaced into engagement with fixed contacts 34 and 35, respectively. Relay contact 35 is an open or blind contact, and therefore is ineffective to provide any circuit operation with switch arm 31 connected thereto. However, with switch arm 30 engaging contact 34, ground potential is applied to one side of relay winding 36, the other side of which is connected to B+; thus an energizing circuit for relay 37 is completed. Accordingly, relay 37 operates and switch arm or actuating member 38 is displaced to engage contact 41, thereby opening the audio channel in the television receiver and muting the sound output thereof. Control device 37 is of the type which remains energized so long as the energizing current flows through winding 36. Accordingly, the audio channel remains muted so long as ground is applied over contacts 30 and 34 to one end of winding 36.

Time delay device 42 is energized concurrently with relay 37 and draws armature 43 up against contact 45 but the circuit therethrough is interrupted at contact 33. No control function is accomplished and after a two-second interval, armature 43 returns to contact 45.

When it is desired to restore the audio output signal of the television receiver, the mute control button is again depressed, which effects another actuation of relay 27, thereby again placing switch arms 30 and 31 in the positions shown in FIGURE 1. Accordingly, the energizing circuit of relay 37 is opened and actuating member 38 engages contact 40, thereby restoring the sound output of the receiver. Although ground is now applied over switch arm 31 to contact 33, switch arm 43 engages an open or blind contact 44 and therefore there is no actuation of relay 47 at this time.

*Volume control*

It is now assumed that the television viewer wishes to alter the volume level by a certain amount without completely muting the audio output. Toward this end the mute button of transmitter 10 is depressed to provide an actuating signal in the output circuit of control tube 16 and thus actuate relay 27. Switches 30 and 31 are displaced to engage contacts 34 and 35, respectively, and relay 37 operates and effects muting. At the same time, time delay means 42 is energized and effects a closure of contacts 43 and 45; that is, arming switch 43 is now in the armed position. This armed position is maintained for a period of two seconds; at this juncture, the television receiver has been muted and the energizing circuit including contact 33 has been armed by the closure of contacts 43 and 45. During the arming interval, that is before the elapse of two seconds from the first actuation of the mute button, the mute button on the transmitter is again depressed to provide another actuating signal in the output circuit of control tube 16, which again operates relay 27 to return switches 30 and 31 to the positions shown in FIGURE 1. Accordingly, the connection between switch 30 and contact 34 is broken, de-energizing relay 37 and again removing the mute of the audio channel of the receiver. Operating potential is removed from time delay device 42 but switch arm 43 remains in engagement with contact 45 (the armed position) for the full period of two seconds irrespective of the fact that relay means 42 has been de-energized. Accordingly, the second pulse from the transmitter completes the energizing circuit for relay winding 46, which circuit extends from ground over switch 31, contact 33, arming switch 43, contact 45 and relay winding 46 to B+. Relay 47 operates and effects the displacement of actuating member 48 of the stepper switch to another tap, thereby altering the resistance in the volume control potentiometer (not shown) or otherwise regulating the volume of the associated television receiver in well known manner. Thus the provision of time delay means 42 permits the viewer to utilize a single command frequency to perform two separate functions, mute and volume control, at the television receiver.

*Receiver off*

It is now assumed that the viewer wishes to turn off the television receiver. This can be done in exactly the same manner as used to turn the receiver on, by first depressing the channel selection button of transmitter 10 to effect a connection of relay arm 23 to contact 25. The mute button of the transmitter is then depressed within the two second interval or whatever delay interval is provided for relay arm 23 to translate an actuating pulse to the output circuit of control tube 16 over relay arm 23, contact 25 and conductor 50 to winding 51 of bi-stable relay 52. Switch arm 53 is then displaced from contact 55 to contact 54, the position shown in the drawing. Accordingly, the energizing circuit for the receiver is broken and the receiver is turned off.

*Timed off*

If the viewer wishes to energize the television receiver without approaching the set after it has been turned off, the control chassis must be energized. Accordingly, a common practice is to maintain the control chassis energized continually, to respond instantly when the viewer wishes to turn on the associated receiver. However, there are many times when it is desirable to de-energize the control chassis for a definite interval during which the television receiver will not be used. By way of example, a viewer retiring for the night may desire to disable the television receiver and the control chassis for a period of five hours, but may also wish to have the control chassis energized after this interval. This, too, may be accomplished with the arrangement of FIGURE 1.

When a viewer disables the television receiver, transmitter 10 is actuated to operate relay 52 as described and place switch arms 53 and 56, which are ganged for concurrent movement, in the positions shown. When switch arm 56 is removed from contact 58 to engage contact 57, the energizing circuit for the control chassis remains intact through switch arm 62 and contact 64. Accordingly, the control chassis retains control over the television receiver.

In the event that "timed off" operation is desired by the viewer, after the operation of relay 52 disables the television receiver, the viewer manually displaces switch arm 62 of timer 63 to de-energize the control chassis for a period determined by the displacement of arm 62. To keep the control chassis off for five hours, the switch arm is displaced to the position of reference numeral 5, so that after a period of five hours has elapsed the switch arm will have returned to engagement with contact 64 to effect energization of the control chassis. At this time, only the control chassis is energized; the television receiver is still turned off. With such an arrangement, it is possible to considerably extend the component life of the several elements of the control chassis, as well as to reduce the amount of power required for operating the equipment over extended periods.

The enhanced versatility and flexibility added to a conventional two-frequency remote control system by the mere addition of inexpensive time delay arrangements is manifest. Whereas a previous two-frequency system was used to control only channel selection and muting of the associated receiver, the present invention also provides for on-off regulation of the receiver as well as volume control. Thus two additional functions are added without altering the transmitter arrangement or any of the receiver circuitry up to and including control tubes 15 and 16. The desirability of providing the extra control functions without substantially increasing the control system cost is evident.

In the embodiment shown in FIGURE 1, muting of the television sound channel is effected by the first of two received pulses even when the viewer is determined to transmit the second pulse and effect a volume regulation rather than the mute control. This temporary muting is obviated by the modification of the invention illustrated in FIGURE 2, wherein contact 34 of bi-stable relay 27 is connected through an operating winding 69 of a time delay means 70 to B+. Time delay means 70 includes a first relay arm 71, shown engaging a contact 72 and displaceable to engage an alternate contact 73; a dash-pot device 74 is connected to relay arm 71. Also included is another operating winding 75 which actuates another relay arm 76 shown engaging a contact 77 and displaceable to engage a contact 78. Another dash-pot 80 is connected to relay arm 76. Relay arm 71 is slow to operate because of the bias force supplied by dash-pot 74, requiring two seconds or some other predetermined time interval to close against contact 73 after time delay means 70 has been energized. Relay arm 71 restores to the illustrated position instantly when the operating potential is removed from time delay 70. In contradistinction, dash-pot device 80 permits relay arm 76 to close immediately upon energization of time delay means 70 to engage the contact 78. After the elapse of a predetermined interval, such as two seconds, relay arm 76 restores under the urging of dash-pot 80 to engage open contact 77.

Suppose now that the viewer wishes to effect a step of volume control relay 47. The first pulse transmitted at the mute/volume control frequency actuates relay 27 and displaces relay arms 30 and 31 into engagement with contacts 34 and 35, respectively. At this moment winding 75 of time delay means 70 is energized and switch arm 76 is displaced to engage contact 78. Accordingly, the energizing circuit for relay 47 is armed but at this time relay arm 31 engages contact 35 and there is no completion of the volume control relay energizing circuit. The mute control function is not effected because relay arm 71 does not close against contact 73 for an interval of two seconds. Upon receipt of the second energizing pulse of the same frequency within the two second period, relay 27 again operates and switch arms 30 and 31 are displaced to engage contacts 32 and 33 as shown in FIGURE 2. Accordingly, time delay means 70 is de-energized and relay arm 71 remains in its illustrated position during this sequence of operation. On the other hand, relay arm 76 is still in engagement with contact 78 and return of relay arm 31 to engage contact 33 completes an energizing path for relay 47 which extends from ground over relay arm 31, contact 33, relay arm 76, contact 78 and winding 46 to B+. Thus the volume control arrangement is stepped one position to alter the level of the output sound signal in the associated television receiver.

When it is desired to mute the sound, the mute button on the transmitter is depressed to actuate relay 27 only once, thereby energizing time delay means 70. After the preset interval of two seconds has elapsed, switch arm 71 is displaced to engage contact 73 and completes the energizing circuit for relay 37. Accordingly, the mute function is similar to that explained in connection with FIGURE 1, except that the predetermined interval elapses before the mute control function is effected, and no temporary muting occurs when two impulses are transmitted to effect volume control regulation.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. In a remote control system for selectively accomplishing a number of controlled functions in response to the receipt of a lesser number of control signals: a receiver for said control signals having a pair of output channels; a first control device coupled to one of said output channels for effecting a first control function in response to receipt of a first control signal; second and third control devices for effecting second and third control functions, respectively, in response to receipt of a second control signal; and time-delay switch means for normally establishing a first signal path between the other of said output channels and said second control device, and for opening said first path and establishing a second signal path between said other channel and said third control device for a predetermined time after receipt of said first control signal, to determine which of said second and third control devices is actuated by said second control signal.

2. In a remote control system for selectively accomplishing a number of controlled functions in response to the receipt of a lesser number of control signals: a receiver for said control signals having a pair of output channels; a first control device coupled to one of said output channels for effecting a first control function in response to receipt of a first control signal; second and third control devices for effecting second and third control functions, respectively, in response to receipt of a second control signal; and means coupled to said first control device for normally establishing a first signal path between the other of said output channels and said second control device, and for opening said first path and establishing a second signal path between said other channel and said third control device for a predetermined time after receipt of said first control signal, to determine which of said second and third control devices is actuated by said second control signal.

3. In a remote control system for selectively accomplishing a number of controlled functions in response to the receipt of a lesser number of control signals: a receiver for said control signals having a pair of output channels; a first relay coupled to one of said output channels, having a first set of contacts for effecting a first control function in response to receipt of a first control signal and having a second set of contacts operable concomitantly with said first set; second and third relays for effecting second and third control functions, repsectively, in response to receipt of a second control signal; and means including said second set of contacts for normally establishing a first signal path between the other of said output channels and said second relay, and for opening said first path and establishing a second signal path between said other channel and said third relay for a predetermined time after receipt of said first control signal, to determine which of said second and third relays is actuated by said second control signal.

4. In a remote control system for selectively accomplishing a number of controlled functions in response to the receipt of a lesser number of control signals: a receiver for said control signals; a first actuating member for effecting a first control function; a first energizing circuit for actuating said first member; a second actuating member for effecting a second control function; a second energizing circuit for actuating said second member; a control device having two stable operating conditions and actuable therebetween in response to succeeding energizing signals applied thereto; a first switch included in said control device, connected in said first energizing circuit and displaceable between open and closed positions as said control device is displaced between said operating conditions; a second switch included in said control device, connected in said second energizing circuit and displaceable between closed and open positions as said first switch is displaced between said open and closed positions, respectively; an arming switch in said second energizing circuit displaceable from a disarmed position to an armed position as said first switch is displaced from said open position to said closed position; means for restoring said arming switch to said disarmed position at a predetermined time after displacement to said armed position; and means coupling said control device to said receiver to utilize said control signals for actuating said control device.

5. In a remote control system for selectively accomplishing a number of controlled functions in response to the receipt of a lesser number of control signals: a receiver for said control signals; a first switch member for effecting a first control function; a first energizing circuit for actuating said first switch member; a second switch member for effecting a second control function; a second energizing circuit for actuating said second switch member; a relay having two sets of contacts and actuable between two stable operating conditions in response to succeeding energizing signals applied thereto, a first contact set being connected in said first energizing circuit and displaceable between open and closed positions as said control device is displaced between said operating conditions and the second of said contact sets being connected in said second energizing circuit and displaceable between closed and open positions as said first contact set is displaced between said open and closed positions, respectively; an arming switch in said second energizing circuit displaceable from a disarmed position to an armed position as said first contact set is displaced from said open position to said closed position; means for restoring said arming switch to said disarmed position at a predetermined time after displacement to said armed position; and means coupling said relay to said receiver to utilize said control signals for actuating said relay.

6. In a remote control system for selectively accomplishing a number of controlled functions in response to the receipt of a lesser number of control signals: a receiver for said control signals; a first actuating member for effecting a first control function; a first energizing circuit for actuating said first member; a second actuating member for effecting a second control function; a second energizing circuit for actuating said second member; a control device having two stable operating conditions and actuable therebetween in response to succeeding energizing signals applied thereto; a first switch included in said control device, connected in said first energizing circuit and displaceable between open and closed positions as said control device is displaced between said operating conditions; a second switch included in said control device, connected in said second energizing circuit and displaceable between closed and open positions as said first switch is displaced between said open and closed positions, respectively; an arming device, having a first contact set connected in said first energizing circuit and a second contact set connected in said second energizing circuit, displaceable from a disarmed position to an armed position as said first switch is displaced from said open position to said closed position; means for restoring said arming device to said disarmed position at a predetermined time after displacement to said armed position; and means coupling said control device to said receiver to utilize said control signals for actuating said control device.

7. In a remote control system for selectively accomplishing a number of controlled functions in a television receiver as a control chassis associated with said receiver responds to a lesser number of control signals: a control device having a set of contacts and two stable positions, being operable therebetween in response to receipt of control signals; an energizing circuit including said contact set for normally maintaining said control chassis energized irrespective of the position of said control device; timer means connected in said energizing circuit only when said control device is in one of said stable positions and selectively operable in said one position to maintain open said control chassis energizing circuit for a predetermined interval; and means for receiving said control signals and actuating said control device in response to receipt of said signals.

8. In a remote control system for selectively accomplishing a number of controlled functions in a television receiver as a control chassis associated with said receiver responds to a lesser number of control signals: a control device having two sets of contacts and two stable positions, being operable therebetween in response to receipt of control signals; a first energizing circuit including one of said contact sets for energizing said television receiver when said control device is in one of said stable positions; a second energizing circuit including the other of said contact sets for energizing said control chassis irrespective of the position of said control device; timer means connected in said second energizing circuit only when said control device is in the other of said stable positions and selectively operable in said other position to maintain open said second energizing circuit for a predetermined interval; and means for receiving said control signals and actuating said control device in response to receipt of said signals.

References Cited in the file of this patent

UNITED STATES PATENTS 2,954,545 Drake ---------------- Sept. 27, 1960